United States Patent [19]
Miller

[11] 4,157,822
[45] Jun. 12, 1979

[54] DOCUMENT FEEDER WITH RECIRCULATION AND UNLOADING

[75] Inventor: Myrl J. Miller, Boulder, Colo.

[73] Assignee: International Business Machines Corporation, Armonk, N.Y.

[21] Appl. No.: 864,346

[22] Filed: Dec. 27, 1977

[51] Int. Cl.² ............................................. B65H 5/22
[52] U.S. Cl. ...................................... 271/3.1; 271/4; 271/9; 271/64; 271/263; 271/265
[58] Field of Search .................... 271/3.1, 4, 265, 263, 271/9, 64

[56] References Cited

U.S. PATENT DOCUMENTS

| Re. 27,976 | 4/1974 | Sahley | 355/64 |
|---|---|---|---|
| 3,556,513 | 1/1971 | Howard | 271/4 |
| 3,630,515 | 12/1971 | Knapp | 271/4 |
| 3,937,454 | 5/1975 | Colwill | 271/6 |

FOREIGN PATENT DOCUMENTS 711888 7/1954 United Kingdom.

*Primary Examiner*—Richard A. Schacher
*Attorney, Agent, or Firm*—Earl C. Hancock

[57] ABSTRACT

A large capacity input bin for a copier/duplicator is capable of receiving a multiplicity of stacks of sheets requiring processing. Control data describing the job to be done for the first stack in the input tray is introduced as by header information, operator input or the like. All sheets associated with the stack are bottom fed from the input tray to a processing station and then to at least one additional tray or bin. The documents are subsequently processed for additional copies as specified by the input data by bottom feeding from the additional tray and top stacking the copied documents into that same tray or into yet another additional tray. Completion of the total number of document copies through the recirculation associated with the additional trays results in unloading of the original documents from the additional tray or trays. Jam recovery is obtainable by reverse or top feeding of documents requiring recycling from the additional bin or bins.

19 Claims, 14 Drawing Figures

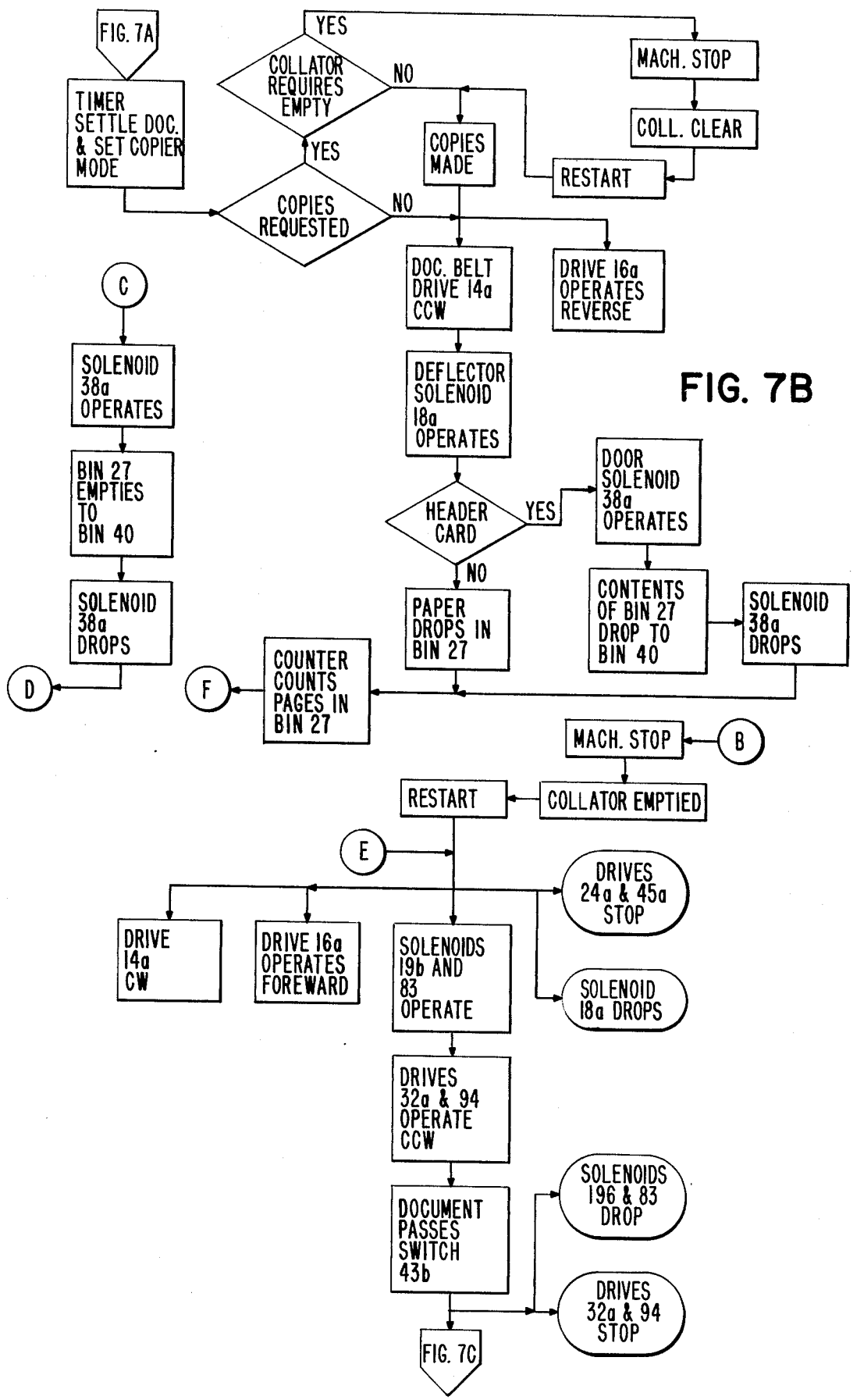

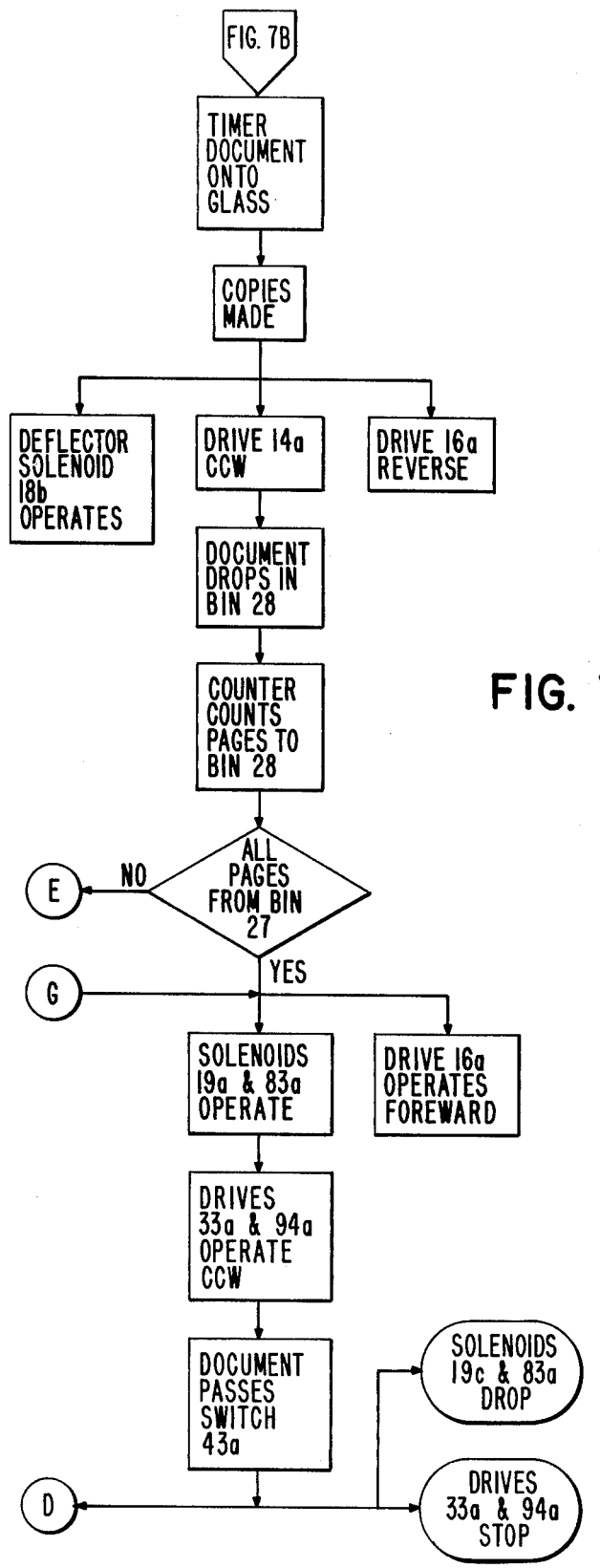

DOCUMENT FEEDER WITH RECIRCULATION AND UNLOADING

BACKGROUND OF THE INVENTION

1. Field of the Invention

This invention relates to document handling apparatus and methods adapted for recirculating of original documents between storage bins and a processing station. More particularly, the present invention relates to apparatus and methods for automatically producing multiple copies of a set of original documents. The present invention is particularly well suited for use in copier/duplicator devices capable of producing exact copies of original documents.

2. Description of the Prior Art

In using the earlier copier/duplicator devices and some contemporary office copiers, the operator can only run multiple copies of a single document or stack of documents by recycling the copying machine for each copy required. This procedure may be acceptable where a small number of documents are to be copied multiple times or where the output of the copying machine includes an automatic collator apparatus for redistributing multiple sequential copies of each page. In an effort to reduce extensive operator attention to the machine operation, various devices have been developed to automate multiple copy runs of original documents with minimal operator intervention. Further, attempts have been made to render the copier/duplicator machine independent of external or additional collator apparatus by recirculating original documents within the machine itself so that multiple collated sets are produced.

For instance, one arrangement includes a cassette which is preloaded with a stack of documents to be copied and with an intervening spacer bar resting on the top of the document stack so that the documents can be bottom fed from this cassette to a processing station and returned for top stacking in the cassette. Such apparatus is incapable of accepting more than one duplicating job at a time within the cassette and further requires the hazarding of paper jam difficulties associated with actuation and removal of the separator bar each time a complete set of documents has been copied.

In yet another form of prior art device with a recirculating document capability, two document receiving stations or bins are placed on opposite sides of a copying station with the documents being bottom fed from one receptacle, across the processing station and top fed into the opposite receptacle. The device requires the reversal of these functions with appropriate gating for bottom feeding from the second receptacle and top stacking into the original receptacle. As with the cassette loaded recirculating structure mentioned previously, this shuttling apparatus can accept no more than a single copying stack at a time. The machine operation must be interrupted while the operator reloads the input tray for each job that must be run. Further, none of the known prior art recirculating techniques are capable of error or jam recovery which require the return of the last document passed through the processing station for a repeat processing at that station.

SUMMARY OF THE INVENTION

The present invention allows sequential recirculating of each document in one or more stacks of original sheet documents through a processing station. An initial bin or input tray receives one or more stacks of the original documents in a predetermined sequence. The sheets from the original stack are transported in their original predetermined sequence from this first bin to the processing station. At least one additional bin is included and the documents are delivered serially from the processing station for stacking in this additional bin. The documents are then serially extracted in the predetermined sequence from the bottom of the stack in this additional bin for redelivery to the processing station. This document extraction is controlled for duplicating the original sequence of sheet delivery and handling at the processing station as is required by the number of copy sets desired.

One novel feature of the present invention is its ability to recover from an error which requires recopying of an original document that has just been passed through the processing station. Accordingly, the document sheets can be withdrawn from the top of the stack in the additional bin for redelivery to the processing station whenever an indication is produced that this sheet must be rehandled by the processing station. This document refeeding apparatus can take the form of a pivotable sheet feeding apparatus that can operate in one position to bottom feed documents from the input tray or in a recovery position where it is pivoted so as to engage the top sheet of the stack in the additional bin.

The device can be preset as by document header sheets and reader apparatus, operator or other equipment input information and the like to specify the particulars of the job about to be run. For instance, the job information might include data defining the number of copies of the document stack to be produced, copy reduction size, possibly the number of documents in the stack, etc. The additional bin can be arranged to be unloaded after the appropriate number of copy cycles has been performed.

By use of the present invention, the copier/duplicator can be operational continuously and without interruption even though additional copy job stacks are added to the input tray. In addition, the machine using this invention does not require operator attention to cycle from one job stack to the next.

The foregoing and other objects, features, advantages and applications of the present invention will be readily apparent to those having normal skill in the art from the following more particular description of the exemplary preferred embodiments of the invention as are illustrated in the accompanying drawings.

BRIEF DESCRIPTION OF THE DRAWINGS

FIGS. 7A–7D are logic flow diagrams of the operation of the elements of FIGS. 1 and 6.

DETAILED DESCRIPTION OF THE PREFERRED EMBODIMENTS

Figure 1:
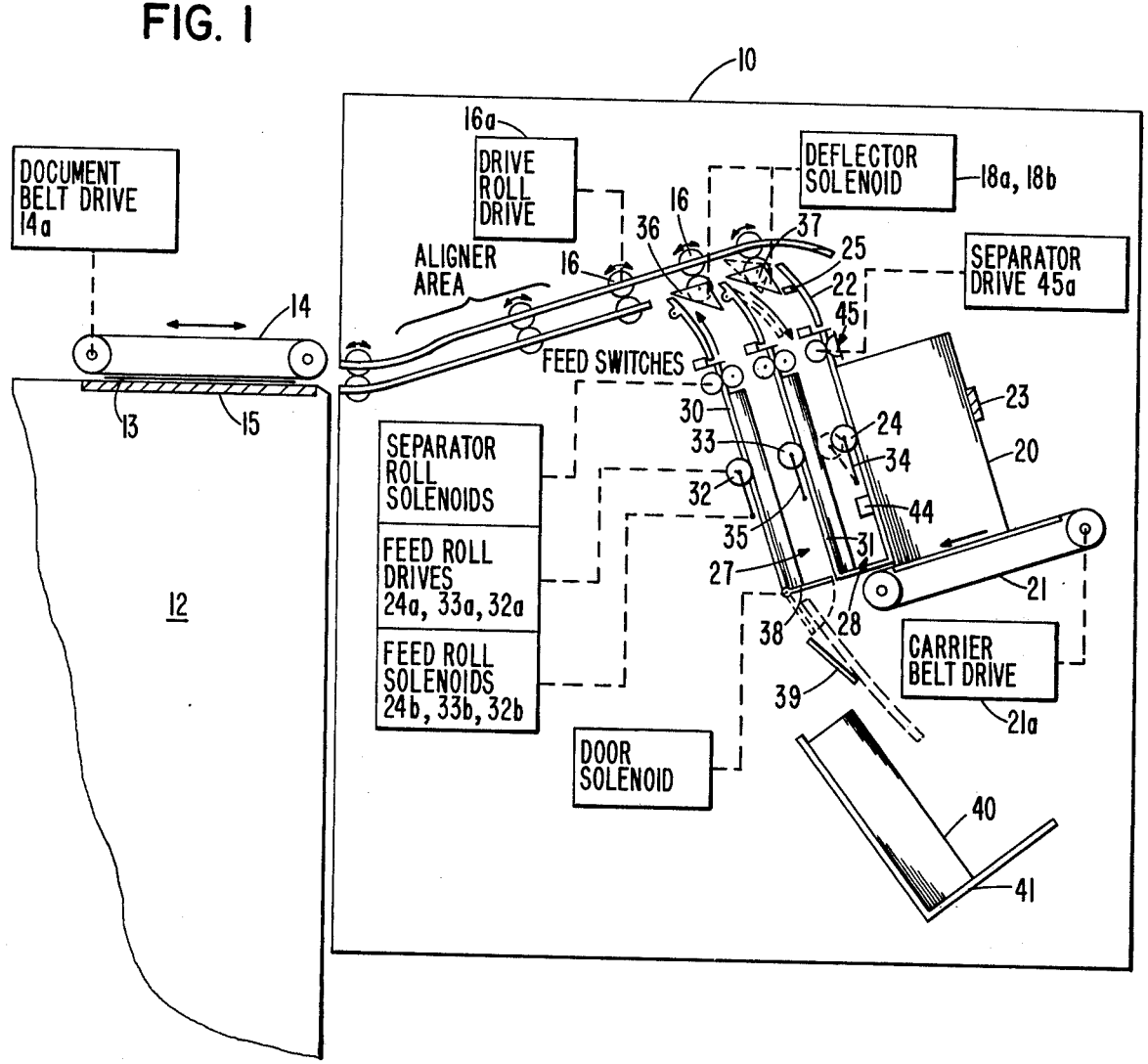
FIG. 1 is a partially sectioned side view of a recirculating document feeder with two recirculating bins and an unloader attached to a copier/duplicator.

The preferred embodiments will be shown and described as automatic document feeders associated with a copier device. In the FIG. 1 embodiment, a feeder assembly 10 in accordance with this invention, is shown for introducing and retrieving documents relative to a conventional copier machine 12. Only document feed belt 14 and document glass 15 of the copier 12 are of interest in association with the present invention and accordingly, the remaining elements of copier 12 have been omitted.

Feeder 10 includes an input job tray 20 capable of having multiple reproduction jobs stacked therein as is generally illustrated in FIG. 1. These jobs are separated by coded identification sheets which identify the subsequent job and describe what is to be done with it in terms of number of copies, duplex, reduction, etc. The stack of jobs in tray 20 rests on a carrier 21 which brings the jobs into contact with wall 22 and thus to feeder mechanism 24 which can be a friction feed roller or the like. Sheets are loaded against wall 22 and feed roller 24 by a follower or force bar 23. As jobs are fed out of input tray 20 by this mechanism, more jobs can be added to the rear of the stack in tray 20.

A code reader device 25 in the paper path from the job tray 20 to document glass 15 reads each identification sheet and programs the machine for the subsequent job and responds to the indicia contained on these header sheets.

Two separate paper storage bins 27 and 28 accept pages fed from document glass 15 after they have been copied. These bins also have lower walls 30 and 31 and feed mechanisms 32 and 33 which can remove pages from the bins and return them to the document glass 15. Feed mechanisms 24 and 33 are pivotably mounted as by arms 34 and 35 and driven such that they can feed documents from either side. For example, feeder mechanism 33 can either bottom feed documents from bin 28 or top feed documents from bin 27. This feature is particularly advantageous for error recovery as will be described later herein. Feed mechanism 32 is also pivotably mounted to allow it to be removed from bin 27 when feed mechanism 33 is in operation.

Document glass 15 has an overlying document feed belt 14 which receives a document 13 as it emerges from the aligning area of the paper path and aligns and registers it at its proper position on glass 15. Feed belt 14 can also operate in the reverse direction and return the document to the paper path upon logic command. Deflectors 36 and 37 in the paper path operate to direct the document to the proper bin 27 or 28.

Use and operation of the FIG. 1 device can be understood from an exemplary job. Assume a job which requires a large number of sets of a five page report. Initially, the original five documents are fed face down out of job tray 20 by feeder mechanism 24 and are sent serially to the document glass 15 where a quantity of copies equal to the available sorter capacity is made. After each document is copied, it is removed from glass 15 and sent to bin 28 where it is top stacked in sequence. When the sorter is cleared of the completed sets, the documents are then fed by mechanism 33 through separator mechanism 17A (not FIG. 2) to glass 15, copied in the same quantity and order, and sent to bin 27 for storage. If still more sets are required, the feeding is done by bottom feed mechanism 32 from bin 27 and the documents after copying are returned to bin 28. This operation alternates between bins 27 and 28 until the required number of sets are complete. At any time, another job may be added to the rear of the job tray 20 stack without disturbing this operation.

Another advantageous feature of the present invention relates to the response of the system to copy jams in machine 12. If the original document associated with a jam in machine 12 is still on glass 15, no action by feeder assembly 10 would normally be required for jam recovery. However, it is frequently the case that the next document will be on glass 15 before the final copies of the previous document have cleared from copy machine 12. If a jam should occur with one of these copies, the feeder assembly 10 allows the machine to replace the previous document on the glass and to remake the lost copies.

This can be accomplished as illustrated in the following example with reference to FIG. 1. Assume that the third document of the five page report has been fed from bin 28 and the second document has been copied and placed in bin 27. A jam occurs on a copy of the second document. To initiate jam recovery, the third document is removed from glass 15 and fed by the document feed belt 14 to the paper path where it is deflected to the rear of bin 28. The pages are then in a bottom-to-top sequence of 4, 5 and 3 in bin 28. Page 2 is fed by feed mechanism 33 after downward pivoting onto the top of the second document in bin 27 for returning this document to glass 15 for the required copies. The second page is then returned to its previous place in bin 27. The third document is then fed by mechanism 24 after pivoting into top engagement with the third document for returning it to glass 15. After normal copy sequencing at glass 15, the third document is deposited on the top of the stack in bin 27 while the fourth page is fed from bin 28 by bottom feeding of mechanism 33 to glass 15. Thus, the machine is fully returned to its normal operation and recovered from the error.

When the job is completed, all documents are sent to bin 27 where the hinged bottom plate 38 opens. The documents are allowed to drop and are deflected by guide 39 or otherwise suitably carried to a completed job stack 40 in output tray 41. The completed job stack 40 can be accessed by the operator for removal. Of course the bottom of bin 28 can likewise be arranged to permit the same emptying procedure as for bin 27. Yet another alternative is to logically control the initial loading of the document stack from input tray 20 into either bin 27 or bin 28 so that the stack will always be in bin 27 after the last document copy set is complete.

Thus it can be seen that the present invention allows input job tray 20 to be stacked with additional new jobs at random without interruption of the machine operation. Carrier 21 positively loads these jobs against the feed mechanism 24. Each job is preceded by entry of data specifying what has to be done. One way of doing this is to precede each job with a flexible coded identification sheet which describes the subsequent job. Reader device 25 detects the indicia information on the job identification sheet as it passes towards the document glass. The dual storage bins 27 and 28 allow recirculation of the documents so as to permit limitless sorting. Three document feed mechanisms 24, 32 and 33 perform the initial stack feeding and subsequent recirculating. Document feeders 24 and 33 can feed from either of the bins to accomplish jam recovery recirculation after a jam condition is sensed as described above. A feed belt 14 on the document glass positions and removes documents from the glass in a conventional manner. The automatic unloading through the trap door 38 into the completed job stack 40 in output bin or tray 41 allows for random removal of each original document set as jobs are completed but without demanding machine shutdown. Tray 41 can be arranged to move so as to accommodate paper feeding of completed jobs from deflector guide 39 onto the top of stack 40 if this should be desired.

Although a specific code reader 25 has been shown and the operation of the invention described relative to use of header sheet data detection, it will be understood that other techniques for establishing the information concerning the job to be processed can be used such as by operator or computer entry of the data and the like. For operator or computer entry, it is only necessary that the control logic include a memory or suitable data storage means capable of accepting and queueing this information in conformity with the jobs in the input stack of tray 20.

Figure 2:
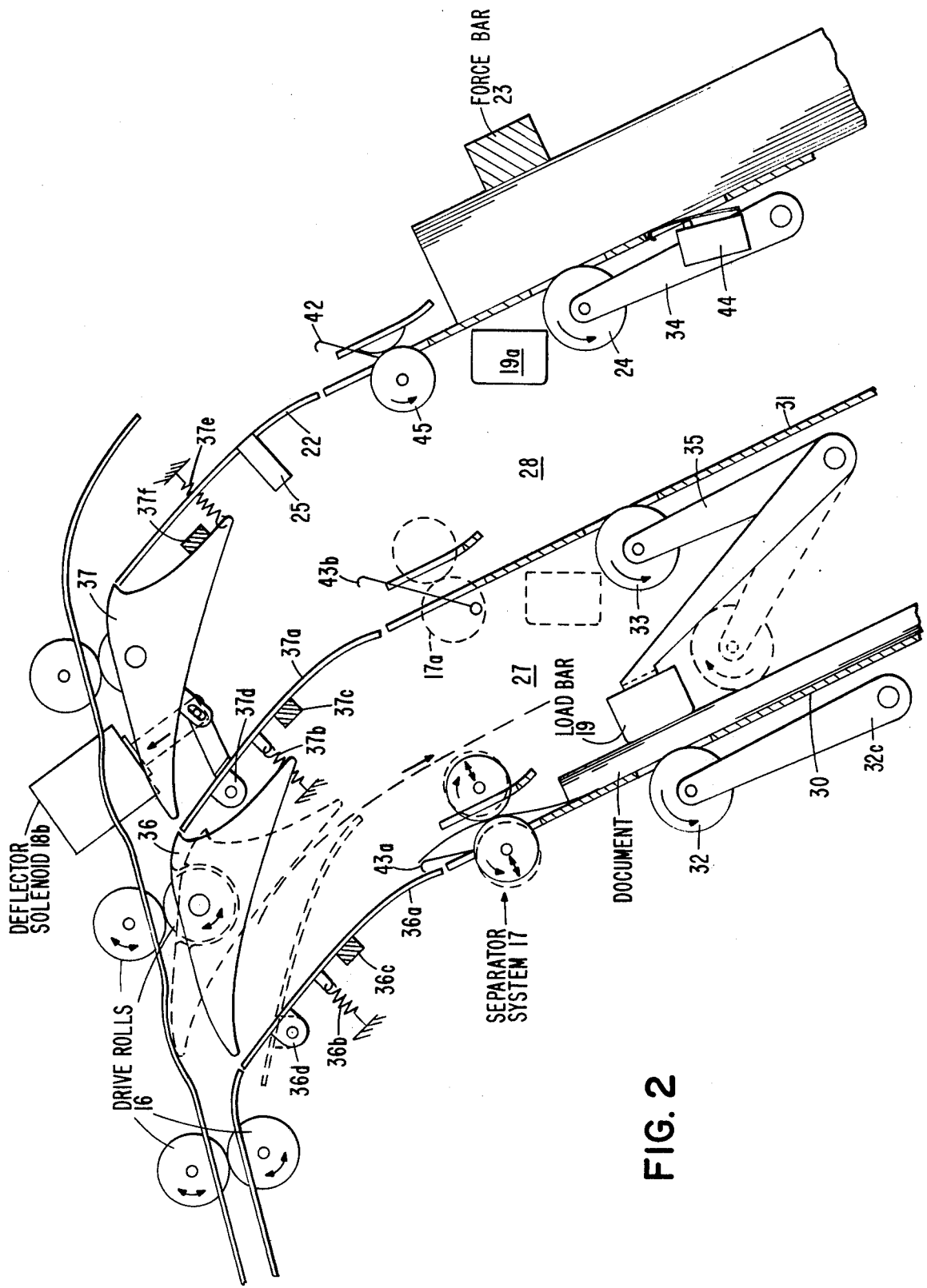
FIG. 2 is a detail view of the paper path mechanism of FIG. 1.

FIG. 2 illustrates in greater detail the elements of the FIG. 1 paper paths associated with the bins 20, 27 and 28. Load bar 19 is pivotably mounted as shown to ensure feeding pressure on the documents towards feed mechanism 32 when documents are to be extracted from bin 27 in the normal operating mode. Bar 19 is pivoted out of the way to the dotted position when bin 27 is being loaded or feed mechanism 33 is top feeding documents from bin 27. Full pivoting of bar 19 may not be required for the top feeding operation since it is only necessary to ensure that bar 19 does not create a disruptive drag on the top sheet. Note that a similar load bar 19A is included for bin 28 and feed mechanism 33.

Deflector solenoids 18A and 18B operate paper deflectors 36 and 37, respectively, along with their cooperating guides 36A and 37A. For purposes of clarity, only solenoid 18B and its associated coupling structure to deflector 37 and guide 37A has been shown, but it will be understood that solenoid 18A is similarly configured for deflector 36 and guide 36A. Note that guides 36A and 37A are normally biased by springs 36B and 37B against stops 36C and 37C to form part of the output feed paths for bins 27 and 28 when solenoids 18 are not actuated. Additionally, springs normally bias deflectors 36 and 37 into the positions shown in FIG. 2 against a stop, only spring 37E and stop 37F for deflector 37 being shown in FIG. 2. However, actuation of either solenoid 18A or 18B results in pivoting of deflectors 36 or 37 along with guides 36A or 37A (i.e., around rotary mounts 36D or 37D) into a position to cause documents being loaded into bins 27 or 28 to stack correctly on top of any other documents already in those bins. This is shown in dotted lines in FIG. 2 for deflector 36 and guide 36A.

Switches 42, 43A and 43B are included in-line with the paper output paths of tray 20 and bins 27 and 28, respectively, to provide appropriate input signals to the feeder controls. Paper drive rolls 16 are positioned in the input/output paper path to the copier and are selectably driven by the machine controls in either direction to carry document sheets towards or away from copier 12 and bins 20, 27 and 28.

Figure 3:
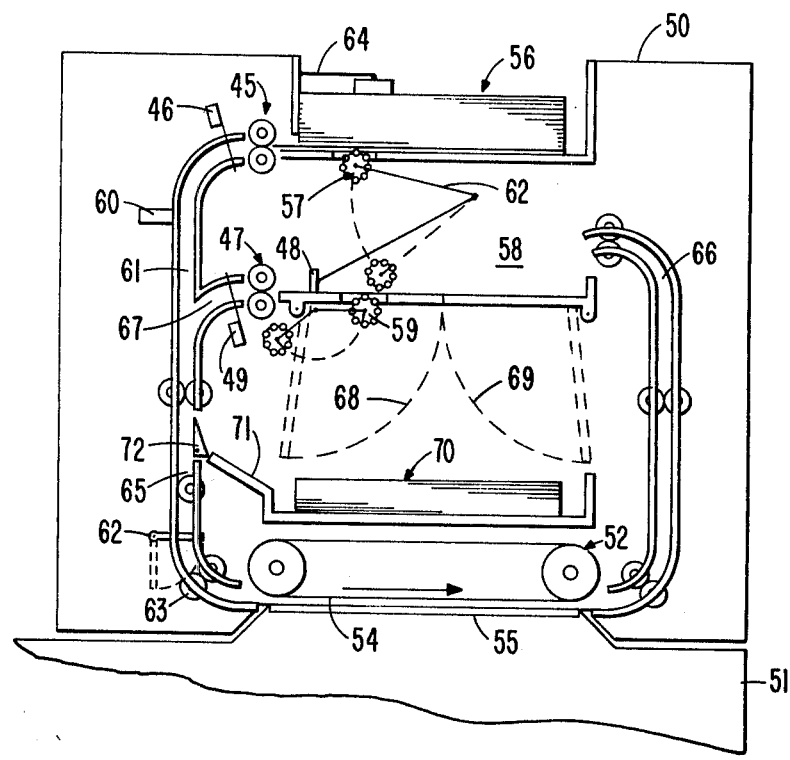
FIG. 3 is a side view of a second embodiment of a document feeder particularly illustrating its utility in conjunction with a single recirculation bin.

FIG. 3 illustrates another embodiment of the present invention including some elements performing functions similar to FIG. 1 such as a load tray, an intermediate receiving tray, feed drives that pivot as needed, unloading from the intermediate tray, etc. In FIG. 3, only one intermediate tray is needed in the automatic document feeder recirculator 50 which is adapted for attachment to a conventional copier 51. In this embodiment, copier 51 is interfaced by a document feeder 52 including belt 54 for introducing documents to document glass 55. Document feeder assembly 50 includes an input tray 56 for receiving a multiplicity of stacks of jobs with document feeder mechanism 57 arranged to bottom feed these documents face up from tray 56. A single recirculating bin 58 is included with its own bottom feed mechanism 59. As documents are bottom fed from input tray 56, they pass job sensors or readers 60 which detect the header sheet information in a manner similar to sensors 25 of FIG. 1.

In use, the operator loads one or more jobs face up into the input or load bin 56. Each job has a header card face up on the bottom of the job with this card describing the functions that are to be performed on that job. The header card is bottom fed by shingler feed wheel 57 through the separator 45 and past sensing switch 46 and the job sensors 60 where the coded job requirements are read. The header card proceeds to gate 62 of the load station 65 via paper path 61. When copier 51 is ready to copy, load station gate 62 retracts and the document feeder carries the document between the document belt 54 and the document glass 55. The copy machine 51 then scans this document to make the copy. The header sheet may or may not be copied depending upon user desires. Alternatively, the header sheet can be promptly passed to the output bin 70 after reading at 60 and without copying if this should be desirable. This can be done by manually or automatically activating deflector 72 which directs the header card onto guide 71 and thence into output bin 70.

During the copy scan cycle, the first page of the job is fed from load bin 56 to the load station 65. Assuming that the header sheet has been copied prior to feeding of the first page of the stack, the scanner of copier 51 is repositioned, while the header sheet is fed from glass 55 through paper path 66 towards bin 58 while the first page is fed from station 62 onto glass 55. Pivotally mounted bar 48 is located to act as a stop for the incoming sheets from path 66. Succeeding pages of the job are bottom fed from load bin 56 past sensor switch 46, copied and top fed into the recirculation bin 58. This continues until the job in process in load bin 56 is completed and the recirculation bin 58 is filled with this job or alternatively continues until another job header card is sensed.

If additional copies or copy sets are needed and recirculation is required, stop bar 48 is lifted and the documents are fed by feed mechanism 59 from the bottom of the recirculation bin 58 to the load station 65 via paper path 67 and the preceeding page is returned to the top of bin 58. Upon completion of the job, recirculation bin 58 is emptied via hinged floor elements 68 and 69 so as to drop the original document stack into the completed job bin 70 where it can be automatically or operator removed.

Figure 4:
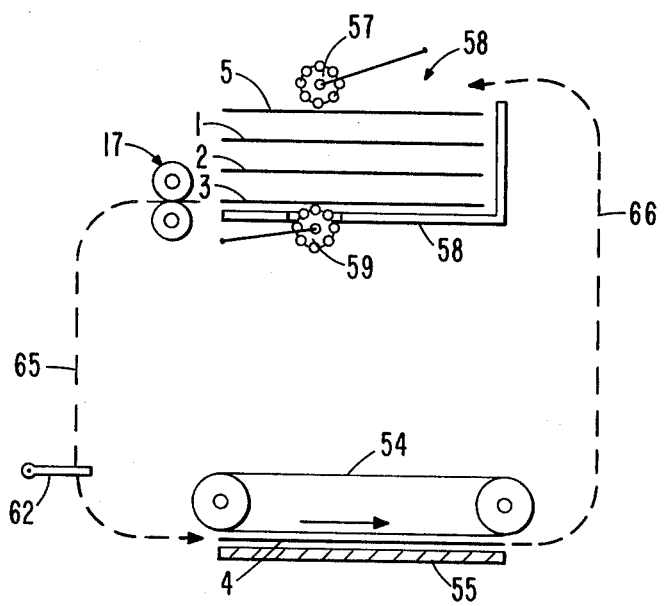
FIG. 4 is a schematic representation of the paper path for the FIG. 3 embodiment.
Figure 5:
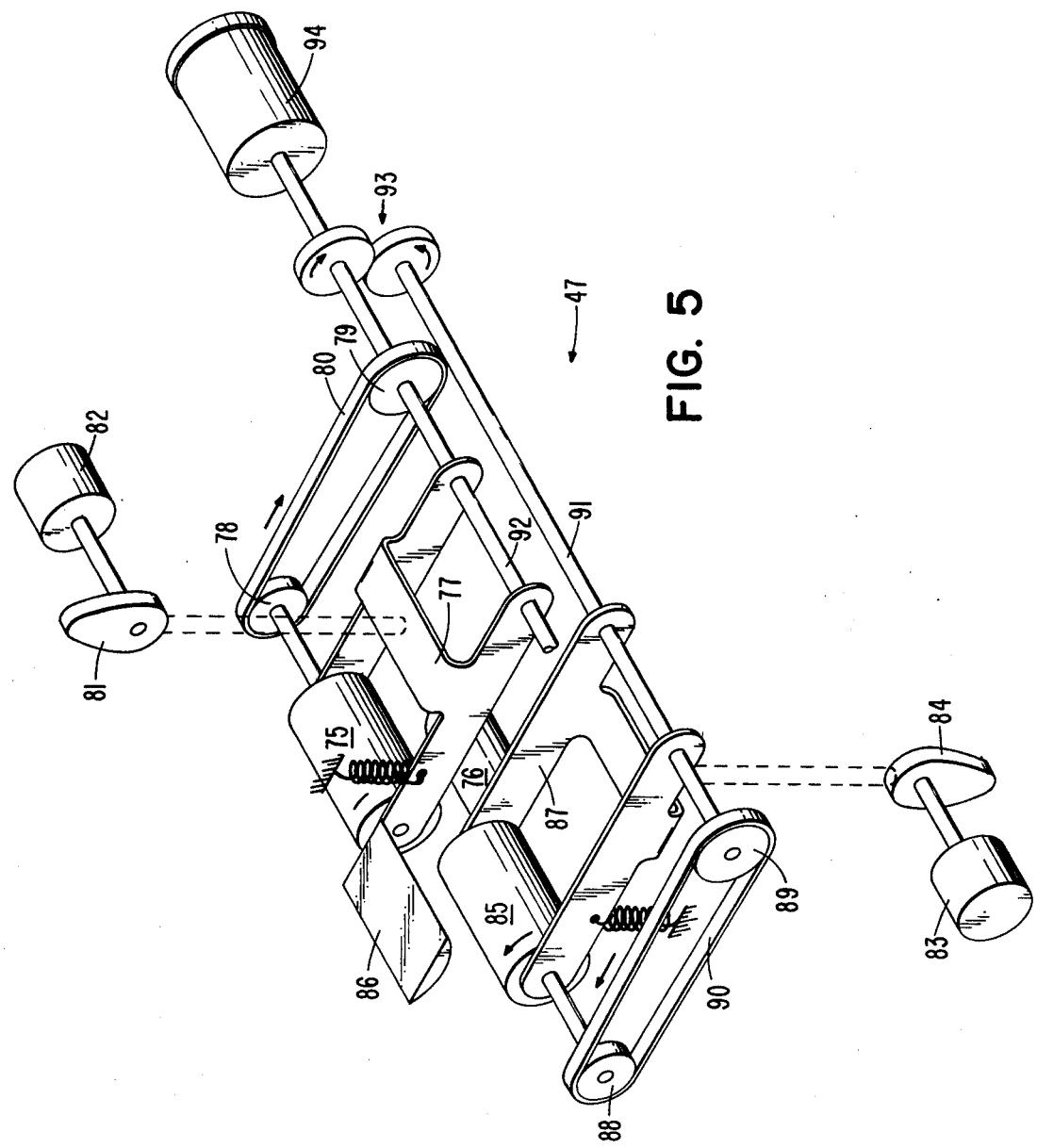
FIG. 5 is an illustration of a separator mechanism useful for the FIG. 2 or FIG. 3 embodiments.

In the event of a paper jam in copier 51 after the page on document glass 55 has been removed, the recovery procedure is similar to that described previously for the FIG. 1 embodiment. However, in the embodiment shown in FIGS. 3 and 4, the documents are face up in bin 58. Consequently, a five document job has page five fed first followed by page four, and so forth. FIG. 4 illustrates schematically the machine status if copier 51 jams while feeder assembly 50 is in a recirculation mode of operation such that page five copies are still in copier 51 at a point that page five has returned to bin 58 and page four is on glass 55. Feed device 57 then drops to the top of the bin 58 stack onto page five and separator 47 switches to its top feed mode as illustrated in FIG. 5. Page five of the set then is fed to document glass 55 while page four is returned to the top of the bin 58 stack. Page five is recopied and returned to the top of the bin 58 stack while page four is again returned to glass 55 via gate 62. The device is thus returned to its proper configuration so as to resume normal copy operation from that point.

FIG. 5 shows the detail of separation system 47 located in bin 58 of FIG. 3, but it is to be understood that similar structure can be employed for separator system 17 for bin 28 and separator system 17A for bin 28 in FIGS. 1 and 2. These separator systems allow documents to be separated from either the top or bottom of the stack in the associated bin. The operation of the dual separator is such that when feeding in normal operation from the bottom of the document stack, separator roll 85 is forced with a predetermined force level against restraint pad 86 by rotation of cam 84 against pivoting bracket 87. Cam 84 rotation is provided by rotary solenoid 83. The drive for separator roll 85 comes through drive belt 90 which runs around pulleys 88 and 89. Pulley 89 is driven by drive shaft 91, gear train 93 and motor 94. During operation of bottom feed separator 85, top feed separator 75 is out of engagement with its restraint pad 76 and thus is inoperative. When top feeding is selected, cam 81 responds to rotary solenoid 82 by pushing separator roll 75 against pad 76 and, at the same time, roll 85 and pad 86 are opened and made inoperable by the reverse rotation of cam 84. Belt 80 is driven over pulleys 78 and 79 via drive shaft 92 and motor 94 in an opposite direction from belt 90.

Figure 6:
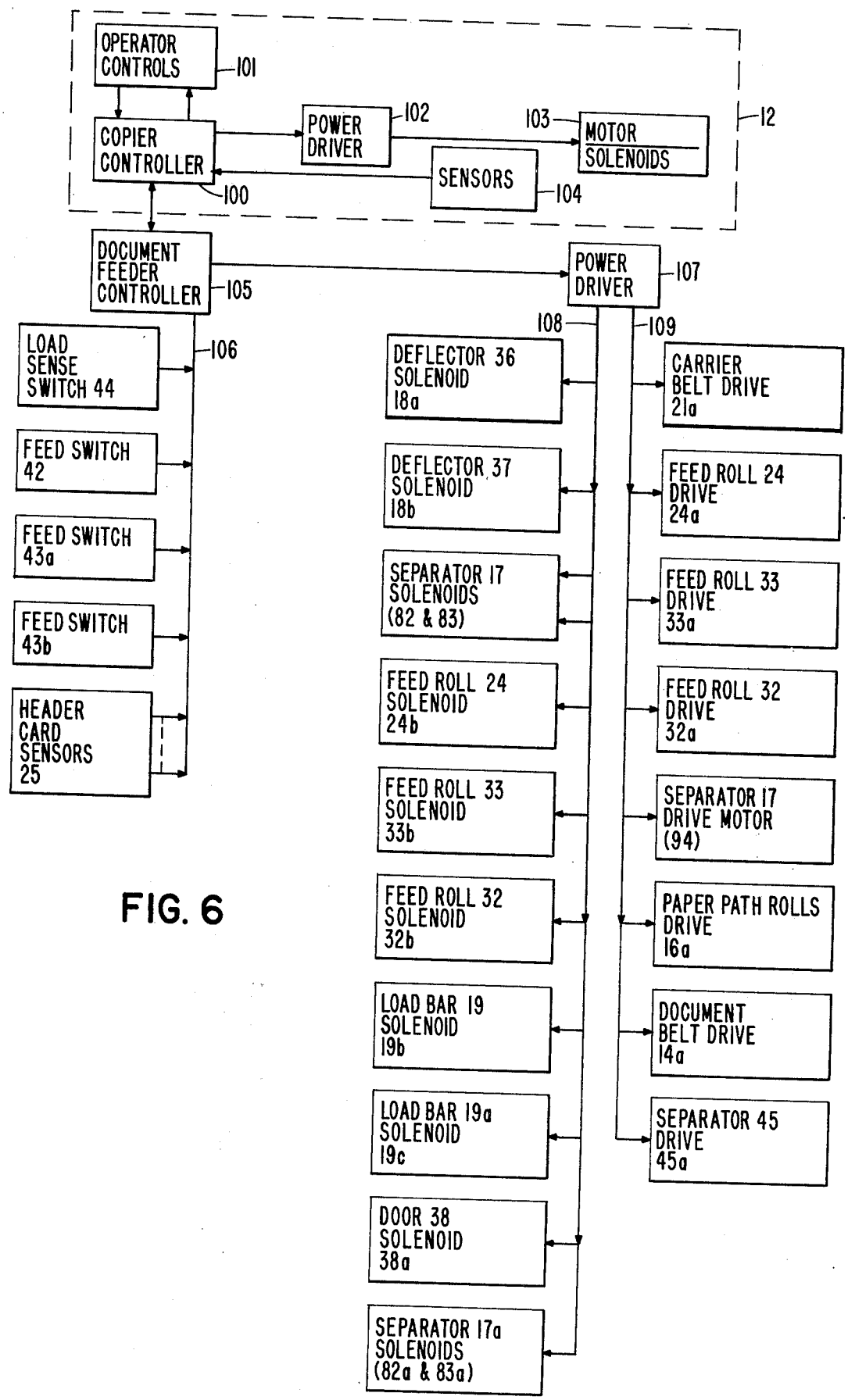
FIG. 6 is a block diagram of the electrical control elements associated with FIG. 1.
Figure 7A:
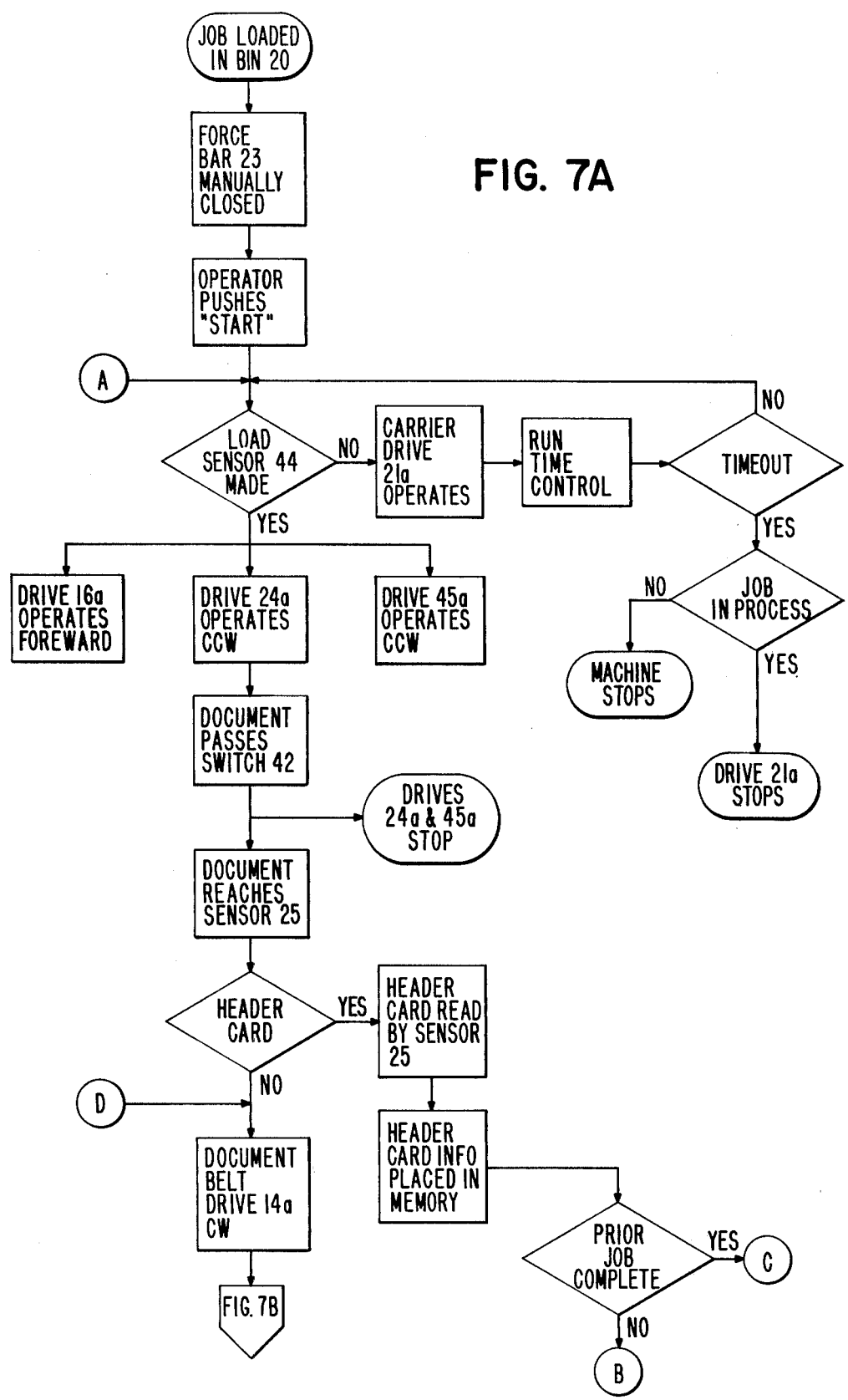
Figure 7D:
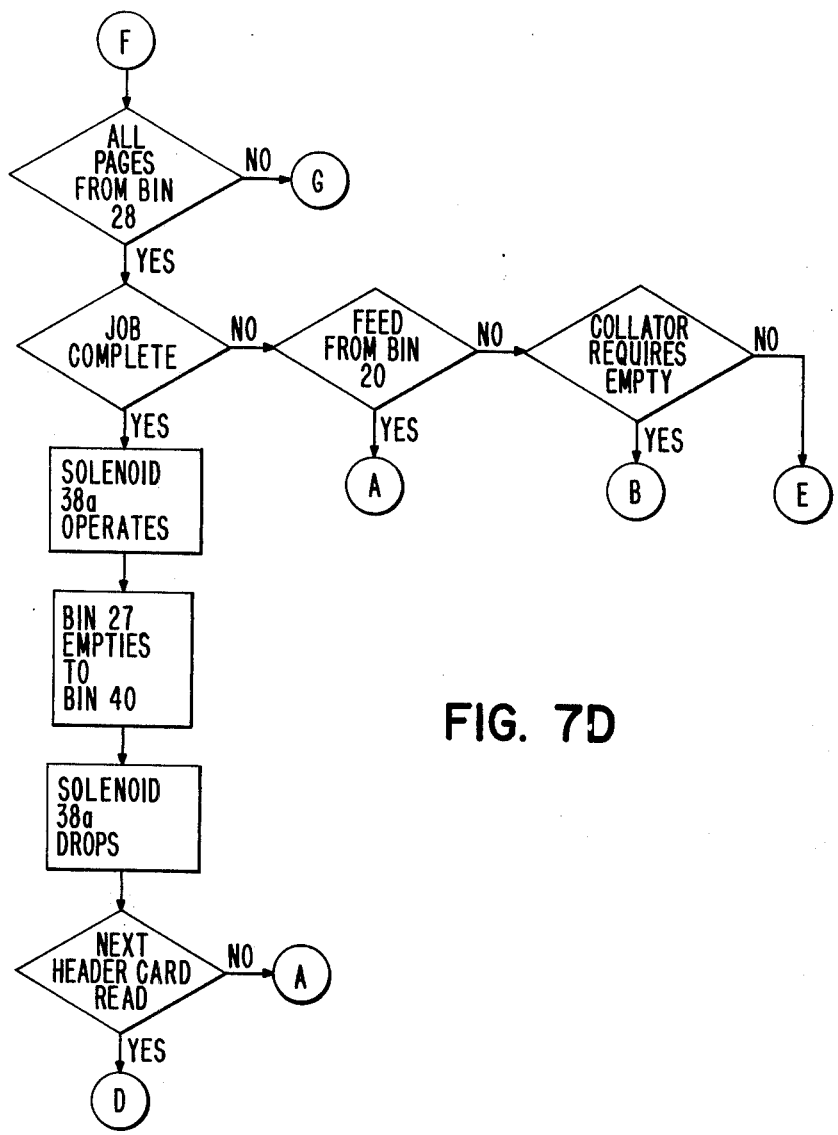

FIG. 6 is a block diagram showing the various electrical controllers, sensors, solenoids and drivers with appropriate interconnections for operation of the mechanisms of FIGS. 1 and 2 and including elements assuming that separators are used in accordance with FIG. 5. This diagram illustrates the interrelationships of these devices for performing the functions outlined in the flow diagram of FIGS. 7A–7D. It also contains the elements for performance of the jam recovery as set forth in the logic flow diagrams of FIGS. 8A and 8B. The copier controller 100 is typically a conventional microprocessor included in copier 12 for interfacing with operator controls 101 as is known in the art. Controller 100 typically controls the various elements internal to copier 12 such as power drive 102 and motors and solenoids 103 while monitoring information from sensor means 104. Additionally, controller 100 issues commands to document feeder controller 105 to cause feeder assembly 10 to operate in proper synchronization with copier 12. In turn, controller 105 responds to information sensed at input cable 106 and issues appropriate control signals to power driver 107. Thus, power driver 107 introduces enabling power as appropriate to selected actuator devices connected to output cable 108 and also operates the selected devices coupled to output 109.

Figure 8A:
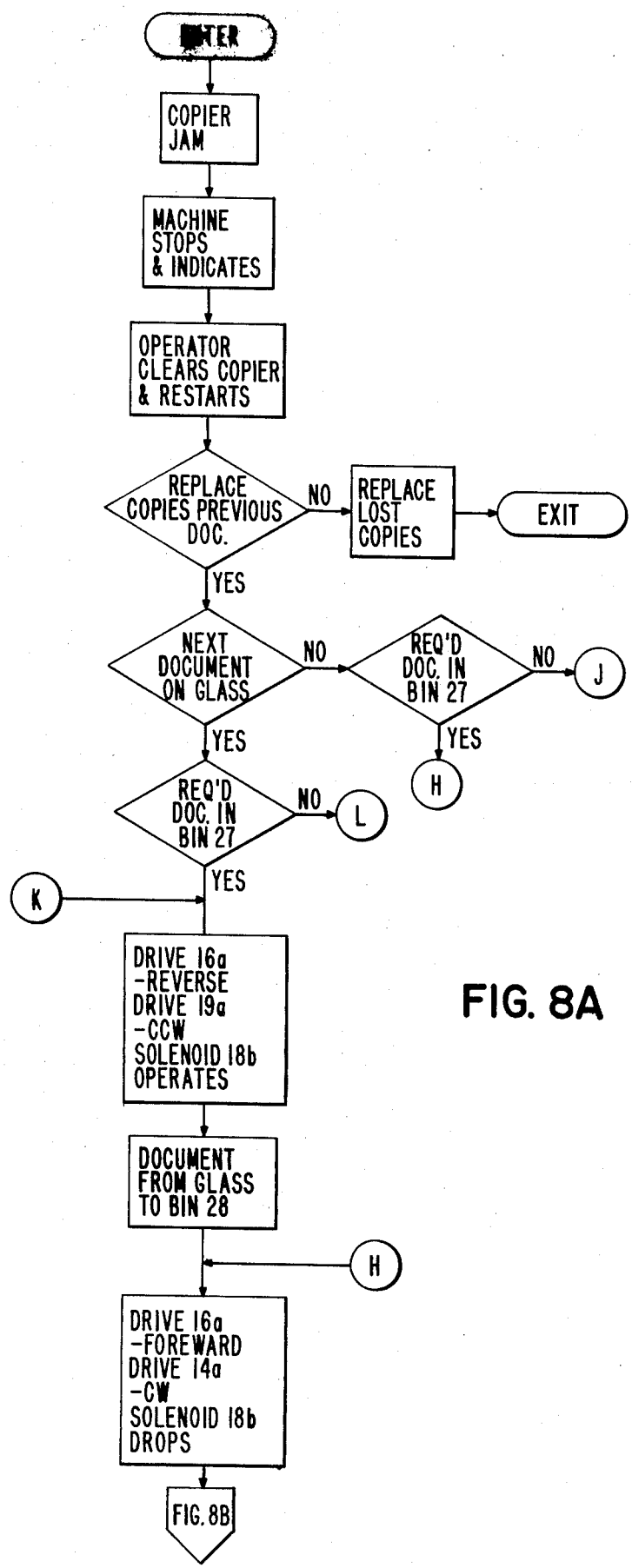
FIGS. 8A and 8B are logic flow diagrams of the jam recovery operation of FIGS. 1 and 6.
Figure 8B:
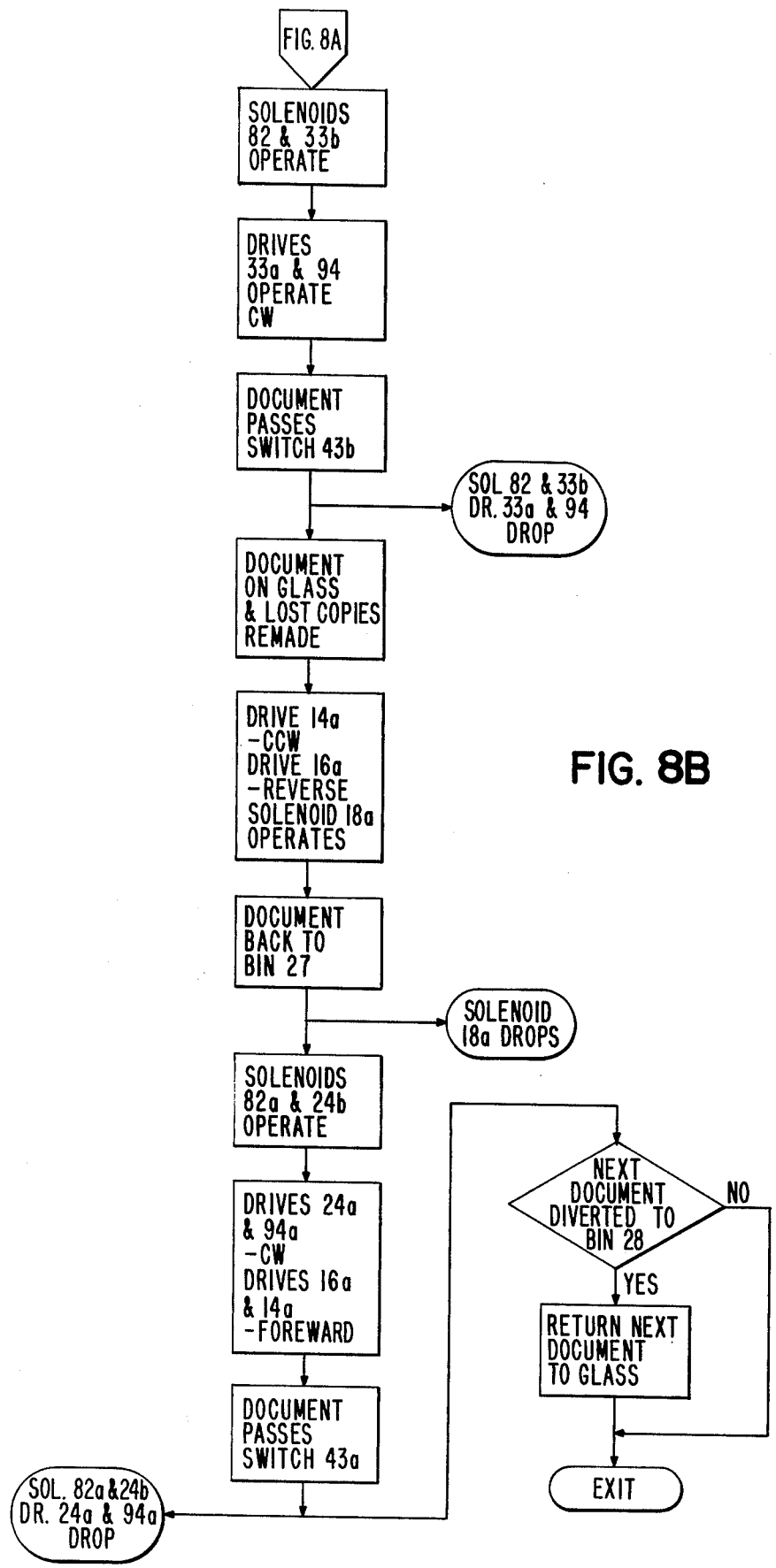

The logic flow diagrams of FIGS. 7 and 8 employ conventional logic blocks and are self-explanatory. The FIG. 7 diagrams demonstrate the logic operation of the various electrical elements as they cause the paper to be fed from load bin 20 to intermediate bins 27 and 28. The FIG. 7 logic also follows the documents as they move back and forth between bins 27 and 28 to allow repetitive use of these bins. Similarly, FIG. 8 follows the logical operation of the electrical components for feeder assembly 10 in aiding copier 12 with various paper movements associated with jam recovery. Note that point "J" of FIG. 8A represents a point in the logical flow sequence similar to point "H" except the drives and solenoids selected are those required to top feed from bin 28. This same relationship holds for point "L" relative to point "K". That is, if the next document is not on the glass and document required for recopying is not in bin 27, then the required document must be in bin 28. Thus, "J" represents a start point for a logic sequence necessary to retrieve the required document from bin 28 followed by recopying of that document and return of the required document to bin 28 before the normal copying sequence is resumed ("Exit"). Similarly, if the next document is on the glass or on its way to the glass while the required document is in bin 28 (i.e., not in bin 27), point "L" represents a start point for a logical sequence wherein the "next" document is placed in bin 27 after which the required document is retrieved from bin 28. After recopying the "required" document is returned to bin 28, the next document retrieved by top feeding from bin 27 for return to the glass and the machine resumes normal copying operations.

Figure 9:
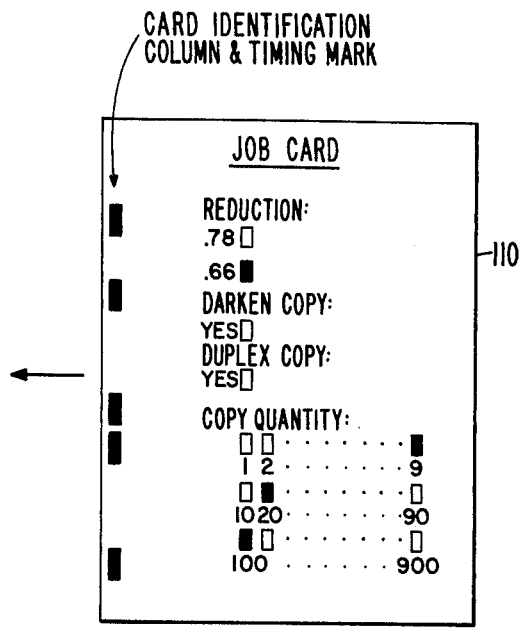
FIG. 9 is an example of a typical header card.
Figure 10:
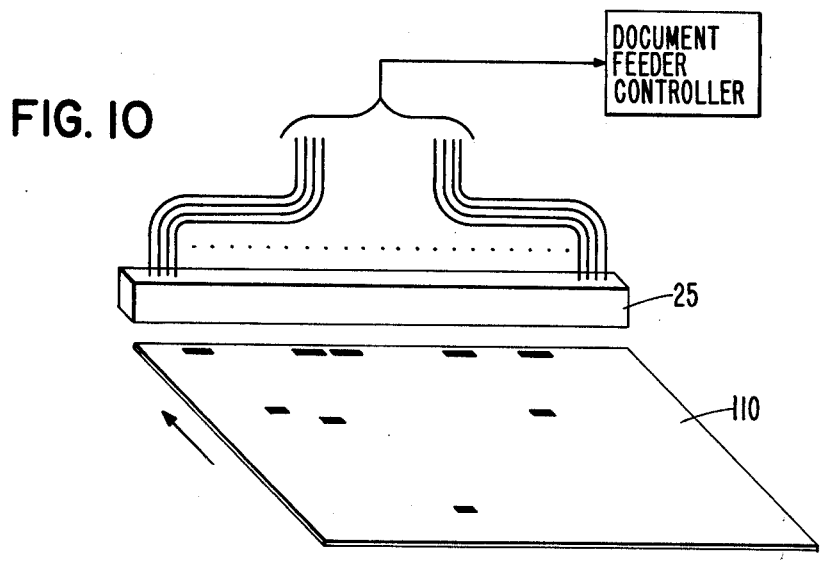
FIG. 10 is a typical header card reader arrangement.

FIG. 9 illustrates a design of a header page which, by operator or machine markings placed on the sheet in appropriate places, can identify the job. Such items as the quantity of copies to be made, reduction size, etc., can be specified. As shown in FIG. 10, sensors such as 25 can "read" these marks and send the desired information to the machine controller. For example, in FIG. 10, the reader arrangement is a stack of units composed of LED light source devices and an array of phototransistors arranged to sense the presence and absence of light reflected from the header document as it moves past assembly 25. The source and sensor units of assembly 25 can typically be Texas Instruments model TIL 139 device.

Although the present invention has been described with particularity relative to the foregoing detailed description of the exemplary preferred embodiments, various modifications, changes, additions and applications of the present invention will be readily apparent to those having normal skill in the art without departing from the spirit of this invention.

What is claimed is:

1. Apparatus for recirculating original sheets through a processing station comprising:
    an input bin for receiving a plurality of stacks of original sheets with the sheets of each said stack being in its own predetermined sequence,
    means for serially transporting the sheets from said input bin to the processing station,
    at least one additional bin,
    means for serially delivering sheets from the processing station for stacking in said additional bin,
    means for serially extracting sheets in the said predetermined sequence of each said stack from the bottom of the stack in said additional bin for redelivery to the processing station, and
    control means selectably operable for enabling said extracting means and said delivering means for duplicating the sequence of sheet delivery and handling at the processing station a preselected number of times.

2. Apparatus in accordance with claim 1 which further includes:
means for serially withdrawing sheets from the top of the stack in said additional bin for redelivery to the processing station, and
means responsive to an indication that a sheet must be rehandled by the processing station for enabling said withdrawing means.

3. Apparatus in accordance with claim 2 wherein said transporting means includes means for feeding sheets from the bottom of said input bin.

4. Apparatus in accordance with claim 3 wherein said sheet feeding means includes a pivotable member engaging the lowermost sheet of the stack in said input bin for propulsion to the processing station.

5. Apparatus in accordance with claim 4 wherein said sheet withdrawing means includes means for moving said pivotable member between the lowermost sheet of said input bin and the top sheet of the stack in said additional bin.

6. Apparatus in accordance with claim 1 which includes means for inspecting each sheet removed from said input bin by said transporting means and for producing an output corresponding to job defining indicia present on any such sheet, said control means being responsive to said inspecting means output for enabling said extracting means a predetermined number of times.

7. Apparatus in accordance with claim 6 which includes means actuable for unloading sheet stacks from said additional bin, said control means including means for actuating said unloading means subsequent to enabling of said extracting means by said predetermined number of times.

8. Apparatus in accordance with claim 7 which further includes a second said additional bin for receiving sheet stacks from said unloading means.

9. Apparatus for recirculating stacks of sheets through a processing station such as an original document imaging location of a copier comprising:
an input tray for receiving a plurality of sheet stacks in serial registry with a bottom wall thereof,
means for transporting sheets serially from said tray bottom wall to the processing station,
first and second bins each having a bottom wall,
first and second means selectably actuable for serially delivering sheets from the processing station for stacking against respective said first and second bin bottom walls,
first and second means for serially extracting sheets from respective said first and second bin bottom walls for redelivery to the processing station, and
control means for initially causing said transporting means and one of said delivery means to serially convey a stack of sheets to the processing station and one of said bins, said control means thereafter alternately operating said extracting means and said delivering means for shuttling the sheet stack between said bins via the processing station for a predetermined number of times.

10. Apparatus in accordance with claim 9 wherein said control means further includes means responsive to an indication that the last sheet passed through the processing station is to be again passed through the processing station, and means enabled by said indication responsive means for withdrawing said last sheet from the top of the stack in the appropriate said bin for return to the processing station and means for replacing said last sheet on the top of the stack in said appropriate bin.

11. Apparatus in accordance with claim 10 wherein said transporting means includes means engaging the sheet on said tray bottom wall and being selectably operable for motivating said sheet from said tray,
said indication responsive means including means for moving said motivating means from said tray into position for engaging the top sheet of a stack in said first bin.

12. Apparatus in accordance with claim 11 wherein said first extracting means includes second means engaging the sheet on said first bin bottom wall and being selectably operable for motivating said sheet from said first bin, said indication responsive means including means for moving said second motivating means from said first bin into said position for engaging the top sheet of a stack in said second bin.

13. Apparatus in accordance with claim 10 which includes second means enabled by said indication responsive means for removing any sheet present at the processing station and for placing the sheet thus removed in a said bin other than said appropriate bin, said second means further including means actuated subsequent to operation of said replacing means for returning the thus removed sheet to the processing station.

14. Apparatus in accordance with claim 9 which further includes means inspecting each document on the bottom of a stack in said tray for producing output signals corresponding to job defining indicia thereon, said control means being responsive to said output signals for controlling the number of times the sheets of the stack associated with said job defining indicia are passed through the processing station.

15. In a system wherein the documents of a stack are serially cycled along a paper path between at least one bin and a processing station by bottom feeding from the stack and top loading on the stack, the process of augmenting jam recovery associated with malfunctions of operations beyond the processing station by responding to a signal indicative that a particular document of the stack in process must be recycled past the processing station comprising the steps of:
retrieving said particular document from the top of the stack in the bin,
diverting any other document in said paper path to a temporary storage location,
returning said particular document to said processing station,
repeating at least a portion of the operation at said processing station relative to said particular document,
replacing said particular document on the top of the stack in said bin, and
transferring said diverted other document from the temporary storage location to said processing station.

16. A process in accordance with claim 15 wherein said system includes at least two bins with said paper path being arranged for guiding the documents serially between the processing station and either of said bins,
said diverting step preceeding said retrieving step and includes the step of directing said any other document to the top of the stack in the other said bin from said bin holding said particular document.

17. The process in accordance with claim 15 wherein said diverting step includes the step of directing said other document to the top of the stack in the bin subsequent to said particular document retrieving step, and said returning step includes the step of top feeding said other document from the stack prior to said particular document replacing step.

18. In a system in accordance with claim 17 wherein said paper path includes first and second document guiding portions with said first portion extending from said bin past an intermediate gate position to said processing station and said second portion extending from said processing station to said bin, said process including the steps of:

indicating if a said other document is either at said processing station or in said paper path second portion, said document retrieving step being responsive to said indicating step for moving said particular document to said intermediate gate position before completion of said other document directing step, said retrieving step further including the step of releasing said intermediate gate after completion of said other document directing step.

19. The process in accordance with claim 18 wherein said other document top feeding returning step includes the step of guiding said other document to said intermediate gate position prior to said particular document replacing step and subsequently releasing said intermediate gate for relocating said other document at said processing station.

* * * * *